United States Patent
Kitchen et al.

(10) Patent No.: US 10,407,882 B2
(45) Date of Patent: Sep. 10, 2019

(54) HYDRANT SHEAR VALVE AND METHOD

(71) Applicant: Mueller International, LLC, Atlanta, GA (US)

(72) Inventors: Richard T. Kitchen, Escondido, CA (US); Richard D. Traver, San Diego, CA (US)

(73) Assignee: Mueller International, LLC, Atlanta, GA (US)

( * ) Notice: Subject to any disclaimer, the term of this patent is extended or adjusted under 35 U.S.C. 154(b) by 7 days.

(21) Appl. No.: 15/894,535

(22) Filed: Feb. 12, 2018

(65) Prior Publication Data

US 2018/0171606 A1 Jun. 21, 2018

Related U.S. Application Data

(63) Continuation-in-part of application No. 14/788,448, filed on Jun. 30, 2015, now Pat. No. 9,890,866.

(60) Provisional application No. 62/131,222, filed on Mar. 10, 2015.

(51) Int. Cl.

| F16K 27/00 | (2006.01) |
|---|---|
| E03B 9/04 | (2006.01) |
| A62C 35/20 | (2006.01) |
| F16K 17/36 | (2006.01) |
| E03B 9/16 | (2006.01) |

(52) U.S. Cl.
CPC ............ E03B 9/04 (2013.01); A62C 35/20 (2013.01); E03B 9/16 (2013.01); F16K 17/363 (2013.01)

(58) Field of Classification Search
CPC ........................................................ E03B 9/04

USPC ....................................................... 137/68.11
See application file for complete search history.

(56) References Cited

U.S. PATENT DOCUMENTS

| 4,127,142 A | 11/1978 | Snider |
| 4,361,165 A | 11/1982 | Flory |
| 5,244,006 A | 9/1993 | Pettesch |
| 5,609,179 A | 3/1997 | Hartman |
| 6,401,745 B1 | 6/2002 | Corder |
| 9,890,866 B2 | 2/2018 | Kitchen |
| 2005/0224114 A1 | 10/2005 | Cook |
| 2015/0240962 A1* | 8/2015 | Plummer ................ F16K 17/40 |
| | | 137/300 |
| 2016/0265197 A1 | 9/2016 | Kitchen et al. |

(Continued)

FOREIGN PATENT DOCUMENTS

| CN | 2063596 | 10/1990 |
| WO | 2016144378 | 9/2016 |

OTHER PUBLICATIONS

European Patent Office (EPO) Communication pursuant to Rule 164(1) EPC regarding the partial supplementary European search report (R. 164 EPC), dated Aug. 31, 2018 Applicant: KSJ Valve Company, LLC (English translation) European Patent Application No. 15 884 895.2.

(Continued)

*Primary Examiner* — P. Macade Nichols
(74) *Attorney, Agent, or Firm* — Taylor English Duma LLP

(57) ABSTRACT

A system and method are disclosed for shutting off the flow of liquid to a hydrant. A break away frangible activator of a valve body becomes dislodged responsive to a hydrant receiving sufficient inadvertent impact. A valve member closes in response to the impact to close off the flow of fluid to the hydrant.

20 Claims, 15 Drawing Sheets

(56) References Cited

U.S. PATENT DOCUMENTS

2016/0265683 A1* 9/2016 Stehling .................. E03B 9/06

OTHER PUBLICATIONS

European Patent Office (EPO) Provisional Opinion accompanying the Partial Search Result, dated Aug. 17, 2018 Applicant: KSJ Valve Company, LLC (English translation) European Patent Application No. 15 884 895.2.

European Patent Office (EPO) Supplementary Partial European Search Report (Under Rule 164, paragraph 1 of the European Patent Convention, dated Aug. 17, 2018 Applicant: KSJ Valve Company, LLC (English translation) European Patent Application No. 15 884 895.2.

Kitchen, Richard T., Issue Notification for U.S. Appl. No. 14/788,448, filed Jun. 30, 2015, dated Jan. 24, 2018; 1 pg.

Kitchen, Richard T.; Certificate of Correction—Post Issue Communication for U.S. Appl. No. 14/788,448, filed Jun. 30, 2015; dated Jul. 10, 2018; 1 pg.

Kitchen, Richard T.; Notice of Allowance for U.S. Appl. No. 14/788,448, filed Jun. 30, 2015, dated Oct. 4, 2017; 8 pgs.

Kitchen, Richard T; Non-Final Office Action for U.S. Appl. No. 14/788,448, filed Jun. 30, 2015, dated Jan. 13, 2017; 7 pgs.

Kitchen, Richard T.; International Preliminary Report on Patentability for PCT/US2015/039124, filed Jul. 2, 2015, dated Sep. 12, 2017, 7 pgs.

Kitchen, Richard T.; International Search Report and Written Opinion for PCT/US2015/039124, filed Jul. 2, 2015, dated Sep. 29, 2015, 14 pgs.

Kitchen, Richard T.; Office Action for Chinese patent application No. 201580077611.9, filed Jul. 2, 2015, dated Nov. 1, 2018, 13 pgs.

Kitchen, Richard T.; Extended European Search Report for serial No. 15884895.2, filed Jul. 2, 2015, dated Dec. 7, 2018, 7 pgs.

Kitchen, Richard T.; Office Action for Japanese patent application No. 2017-548223, filed Jul. 2, 2015, dated Oct. 9, 2018, 7 pgs.

Kitchens, Richard T.; Notice of Refusal for Japanese patent application No. 2017-548223, filed Jul. 2, 2015, dated Oct. 9, 2018, 37 pgs.

\* cited by examiner

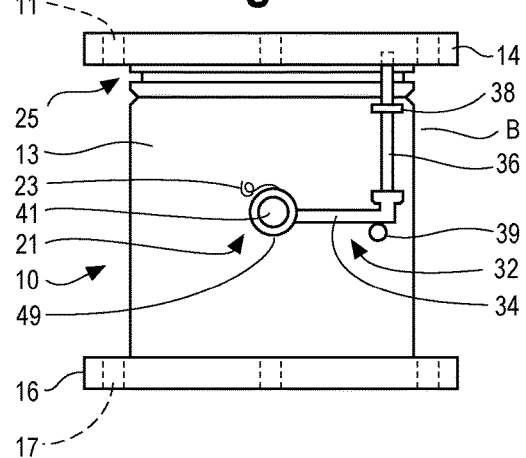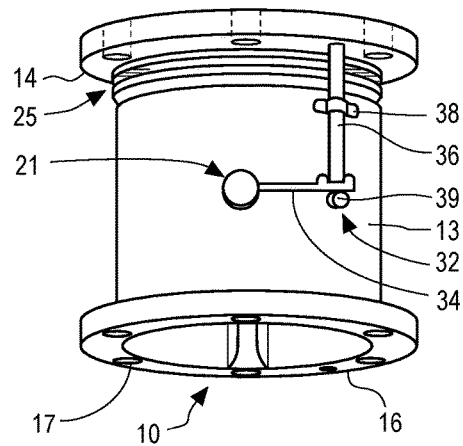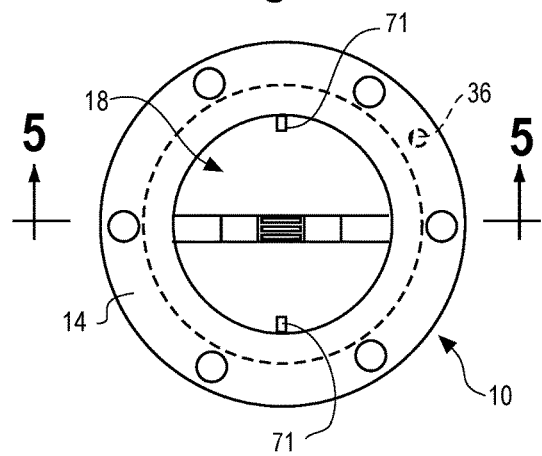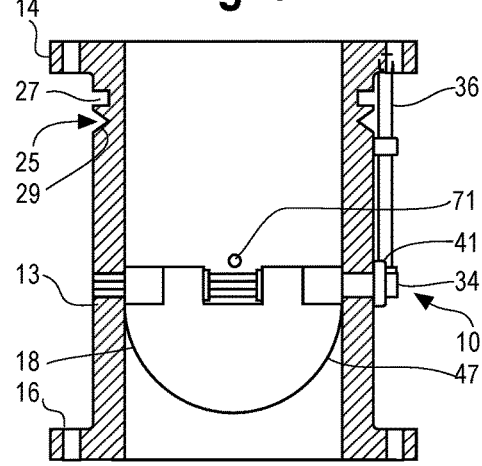

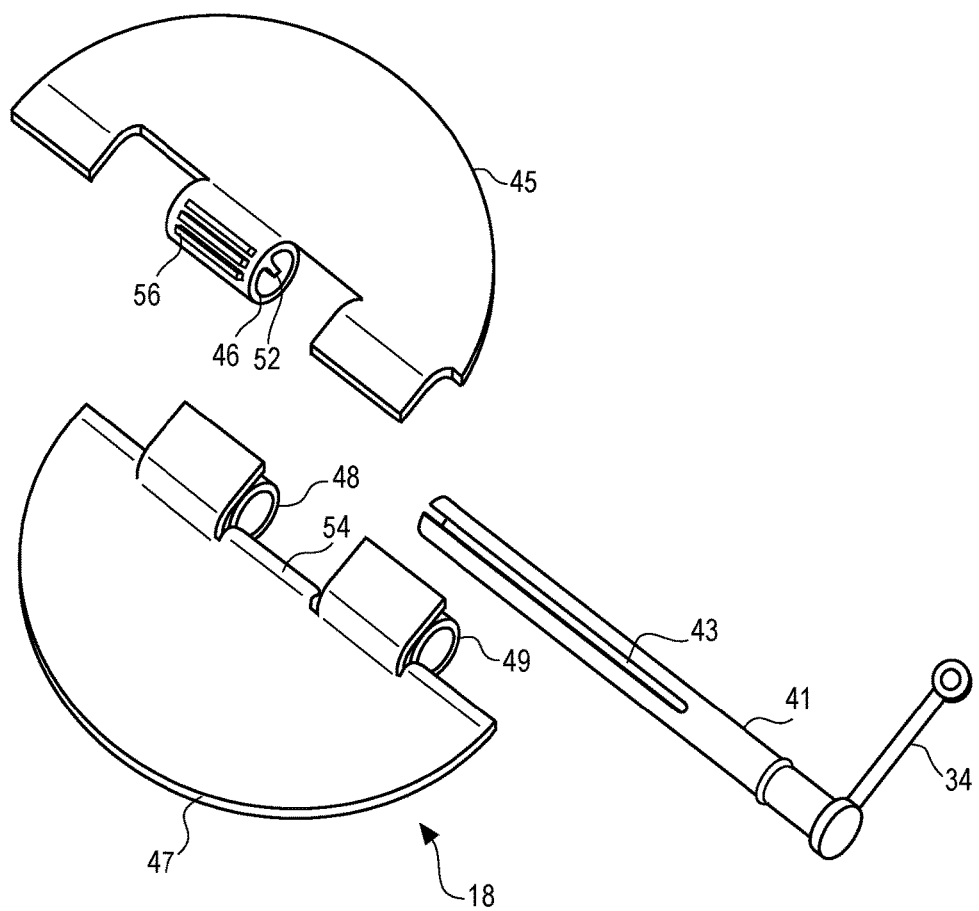

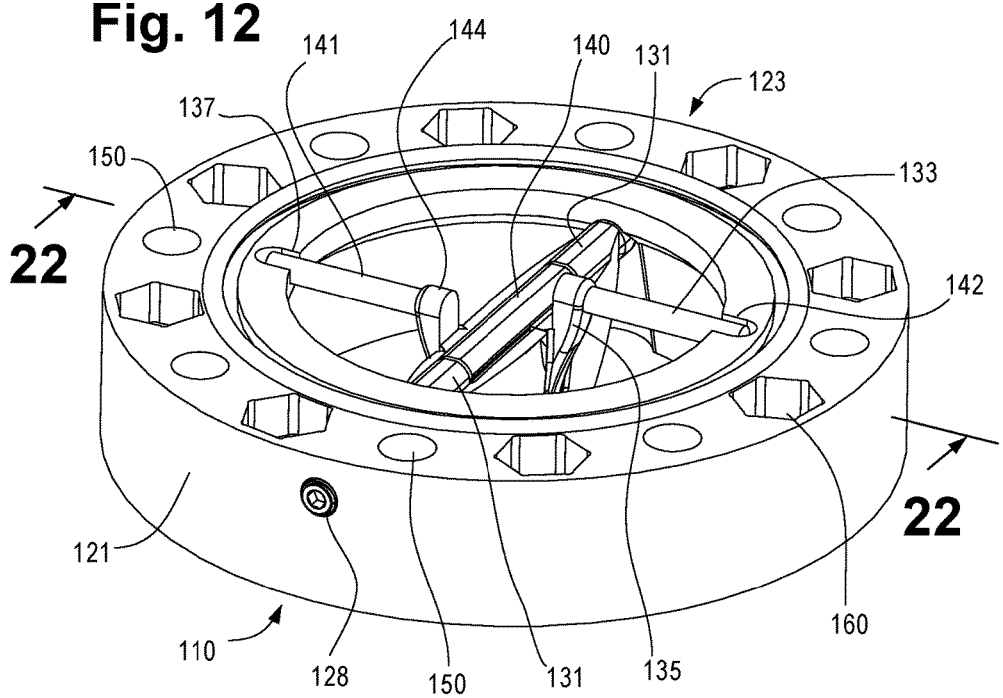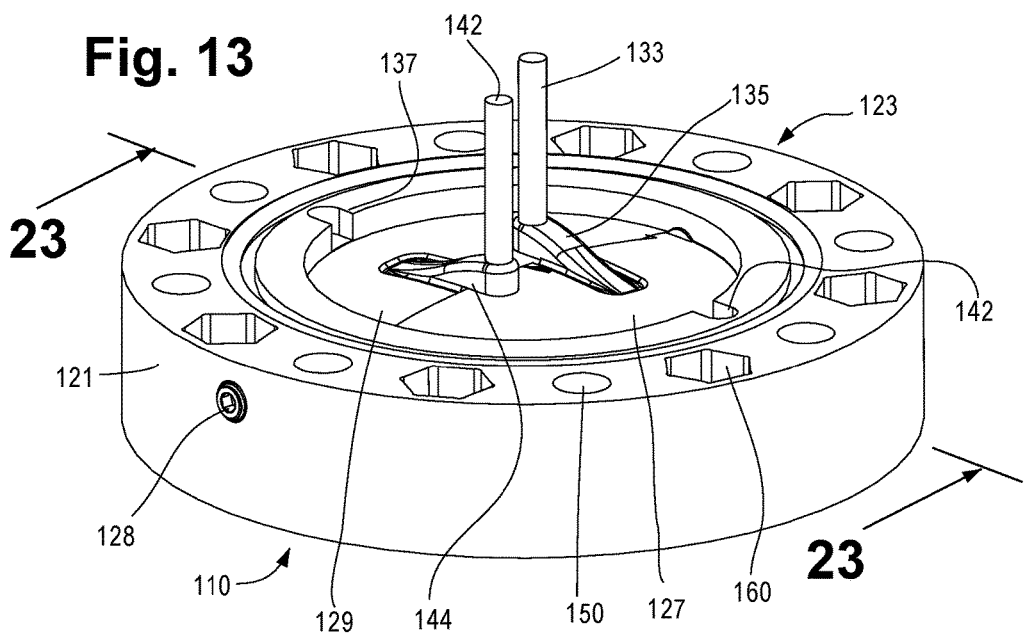

HYDRANT SHEAR VALVE AND METHOD

RELATED APPLICATIONS

This application claims priority to, and is a Continuation-in-Part of, U.S. non-provisional patent application Ser. No. 14/788,448, filed on Jun. 30, 2015, entitled HYDRANT SHEAR VALVE AND METHOD, which is related and claims priority to U.S. provisional Patent Application No. 62/131,222, filed on Mar. 10, 2015, entitled HYDRANT SHEAR VALVE AND METHOD, each of which is assigned to the same assignee with the same inventors, and is incorporated herein by reference in its entirety.

FIELD OF THE INVENTION

The present invention in general relates to a hydrant shear valve and a method of shutting off the flow of liquid to a hydrant.

BACKGROUND OF THE INVENTION

There is no admission that the background art disclosed in this section legally constitutes prior art.

Water waste and property damage has been caused inadvertently when, for example, a fire hydrant is struck accidentally by a moving motor vehicle and dislodges from the water supply pipe. When a fire hydrant is damaged by a moving vehicle, many thousands of gallons of water per minute may be sprayed into the air under great pressure as high as about sixty feet. This water remains gushing uncontrollably for many minutes such as 30 to 60 minutes, until the fire department manually shuts off an inline valve.

The property damage done to surrounding businesses, homes and other property within a wide radius such as fifty yards, may be conservatively many thousands of dollars as a direct result of flooding. There is also the added cost to the tax payer of digging up and replacing the broken line, not taking into account many thousands of gallons of water, which is becoming a precious commodity.

BRIEF DESCRIPTION OF THE DRAWINGS

In order to better understand the invention and to see how the same may be carried out in practice, non-limiting preferred embodiments of the invention will now be described with reference to the accompanying drawings, in which:

FIG. 2 is an enlarged diagrammatic pictorial elevational view of the hydrant shear valve of FIG. 1;

FIG. 3 is a pictorial view of the valve of FIG. 2;

FIG. 4 is a top view of the valve of FIG. 2;

FIG. 5 is a sectional view of the valve of FIG. 4 taken substantially on line 5-5 thereof;

FIG. 6 is an enlarged exploded pictorial view of a component of the valve of FIG. 2;

FIG. 12 is a pictorial view of the valve of FIG. 11, illustrating it in its opened position;

FIG. 13 is a pictorial view of the valve of FIG. 11, illustrating it in its closed position;

DETAILED DESCRIPTION OF CERTAIN EMBODIMENTS OF THE INVENTION

Figure 1:
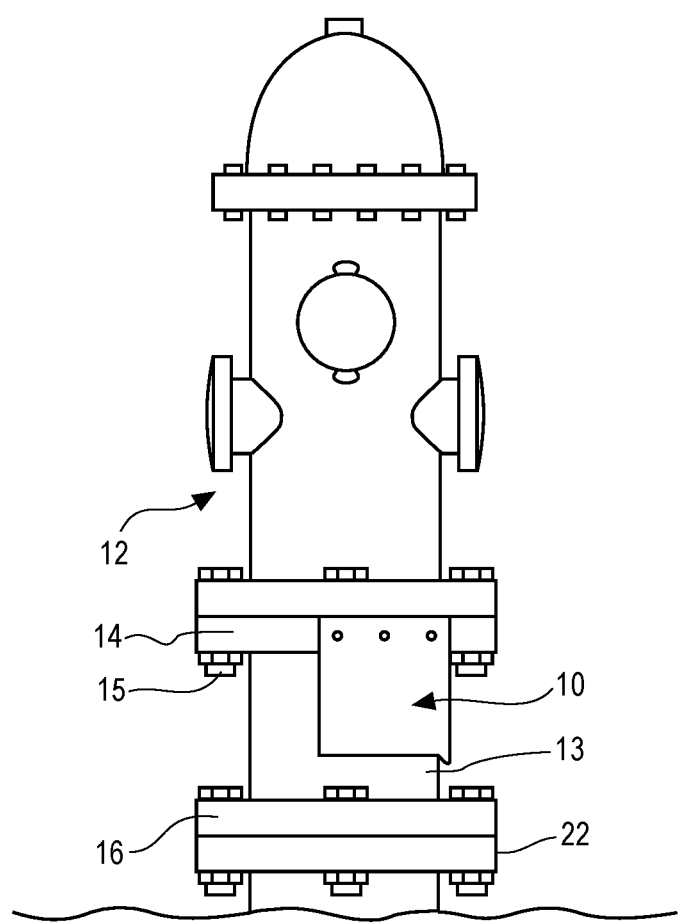
FIG. 1 is a diagrammatic pictorial elevational view of a hydrant shear valve which is constructed according to an embodiment, and which is illustrated mounted to a hydrant in fluid communication with a hydrant water supply.

Certain embodiments of the present invention will now be described more fully hereinafter with reference to the accompanying drawings, in which some, but not all, embodiments of the invention are shown. Indeed, these embodiments of the invention may be in many different forms and thus the invention should not be construed as limited to the embodiments set forth herein; rather, these embodiments are provided as illustrative examples only so that this disclosure will satisfy applicable legal requirements. Like numbers refer to like elements throughout.

It will be readily understood that the components of the embodiments as generally described and illustrated in the drawings herein, could be arranged and designed in a wide variety of different configurations. Thus, the following more detailed description of the certain ones of the embodiments of the system, components and method of the present invention, as represented in the drawings, is not intended to limit the scope of the invention, as claimed, but is merely representative of the embodiment of the invention.

According to at least one embodiment, a hydrant shear valve for a hydrant may be coupled in fluid communication with a hydrant water supply pipe including a valve body mounted in fluid communication between the hydrant and the water supply pipe. A two-piece valve member is pivotally mounted in the valve body to move between an open position and a closed position. The valve member includes a pair of valve member portions which are disposed overlapping one another axially aligned within the valve body in the open position, and which are disposed in a co-planar configuration in engagement with a valve seat in the closed position.

The hydrant shear valve may include at least one bias member for maintaining releasably the valve member portions in the open position and for permitting the valve member portions to be moved to the closed position under the force of fluid flowing from the supply pipe. Also, at least one frangible actuator breaks away when the hydrant is hit with sufficient impact to free the bias member, to cause the valve member portions to move toward the closed position.

According to at least one embodiment, a method of making a hydrant shear valve for shutting off the flow of fluid to a hydrant includes mounting at least one frangible actuator on a valve body to break away in response to the hydrant receiving a sufficient impact. The method also may include mounting a two-piece valve member in the valve body to close off the flow of fluid to the hydrant in response to the breaking away.

At least one purpose of this hydrant shear valve is to use the water pressure itself to close the valve. In one embodiment, replacing the broken shear valve may merely be a matter of unbolting it from fire hydrant and replacing it. According to another embodiment, the shear valve is designed to remain intact, and only broken shear bolts would require replacement.

The use of a shear valve for a hydrant is, of course, highly desirable for water conservation and for avoiding property damage and even injury to humans and animals. However, by adding an automatic shut off valve upstream of the hydrant, the valve itself must not reduce the quantity or pressure of water flowing to the hydrant when it is being used to facilitate fighting fires. The shear valve in its open position must not provide undue resistance to water flowing through it to the hydrant. According to an embodiment, the shear valve includes valve member portions or parts which are designed to present little or no hydrostatic resistance to the high pressure water flowing through the open valve during normal operation when the valve is open. Applicants have discovered through trial and error certain inventive profile contours for enabling the valve to have little or no hydrostatic resistance to water flowing through the open valve so as not to interfere with the required quantity and pressure of water being supplied to a hydrant. Such required quantity and pressure must be available at the hydrant to properly fight fires.

In order for conventional hydrants to be bolted to water supply pipes, both the hydrant and the supply pipes have the same predetermined matching bolt hole patterns to ensure that the hydrant and supply pipe can be readily secured together by nuts and bolts. Additionally, once the hydrant is secured on top of the supply pipe, the outlet of the hydrant faces the street or roadway so that fire fighters can connect hoses to the hydrant in a proper manner. Such is a requirement by some fire department or agencies. An embodiment ensures that the shear valve can be secured between a hydrant and a water supply pipe, and have the hydrant positioned with its outlet disposed properly relative to the street or roadway.

Referring now to FIGS. 1-10 of the drawings, there is shown a hydrant shear valve 10, which is constructed in accordance with an embodiment, and which is adapted to be mounted in fluid communication below a hydrant 12 and coupled in fluid communication to an upper end of a water supply pipe 22 serving as a source of a hydrant water supply under pressure.

The valve 10 includes a valve body 13 having an upper flange 14 and a lower flange 16, and having a pivotally mounted 2-piece valve member 18 pivotally mounted on a transverse rod or shaft 41 (FIGS. 6 and 8) behind a protective cover plate 19 (FIG. 1) fastened to the upper flange 14. The upper flange 14 includes a series of spaced apart fastener holes such as hole II (FIG. 4) for receiving fasteners such as fastener 15 (FIG. 1). The lower flange 16 includes spaced fastener holes such as hole 17 (FIGS. 2 and 3) for receiving fasteners such as the fastener 15 of FIG. 1.

A bias member or mechanism 21 in the form of a spring 23 (FIG. 2) releasably maintains the valve member 18 in its open position. A frangible actuator or portion 25 of the body 13 is adapted to break away when the hydrant 12 is hit with inadvertent sufficient impact such as when a vehicle (not show) collides with it. The frangible 25 actuator may be annular in shape and may include a square annular serration 27 and a V-shaped annular serration 29 to enable the valve body 13 mounted to the bottom portion of the hydrant 12 by the upper flange 14 to break away or fracture as a result of lateral forces and/or angular forces.

A trigger mechanism or member generally indicated at 32 includes a transversely extending arm 34 connected to the valve member 18, and an axially extending shear pin 36 connected between the outer end of the arm 34 and fixed at the upper flange 14 to maintain the valve member 18 in its open position engaging stops 71 as best seen in FIGS. 4 and 5 to permit liquid such as water to flow under pressure through the hydrant 12 when used normally such as by fire fighters. A guide bracket 38 receives an intermediate portion of the shear pin 36 to help secure it in place. The arm 34 is normally spring biased by the spring 32 so that its distal end is rigid or pressed against a stop 39. When a sufficient impact on the hydrant 12 occurs, the frangible actuator 25 fractures to break away the upper body portion and the shear pin 36 to free the pin 36 and to permit the spring 23 to cause the arm 34 to rotate in a counterclockwise direction as viewed in FIG. 2 by the shaft 41, whereby the valve member 18 springs toward its closed position as indicated in FIG. 4. The water pressure then continues to move C-shaped valve member portions 45 and 47 of the 2-piece valve member 18 into its co-planar closed position (FIGS. 4, 7 and 10) and is maintained in that position to shut off any further discharge of water, until personnel can turn off a water main supply valve (not shown) so that the shear valve 10 can be removed from the hydrant and replaced with a new shear valve (not shown).

Considering now the valve member 18 in greater detail with reference to FIGS. 4, 5, 6, 7, 8, 9 and 10, the valve member 18 includes the rotatably mounted shaft 41 disposed transversely within the valve body 13 to drive the valve member 18 into its closed position. The shaft 41 includes an axially extending keyway slot 43 secured to a valve member portion 45 having a sleeve 46 which receives the shaft 41 at the keyway 43. The valve member portion 47 cooperates with the valve member portion 45 when disposed in a co-planar configuration to shut off fluid flow within the hydrant shear valve 10. The valve member portion 47 includes a pair of spaced-apart sleeves 48 and 49 for receiving the shaft 41 on opposite sides of the sleeve 46 of the valve member portion 45. The sleeve 46 includes an internal key 52 which fits into the keyway 43 so that when the arm 34 fixed to the shaft 41 rotates in a counterclockwise direction as viewed in FIG. 2 upon impact to the hydrant 12, the valve member portion 45 rotates with the shaft 41.

Figure 7:
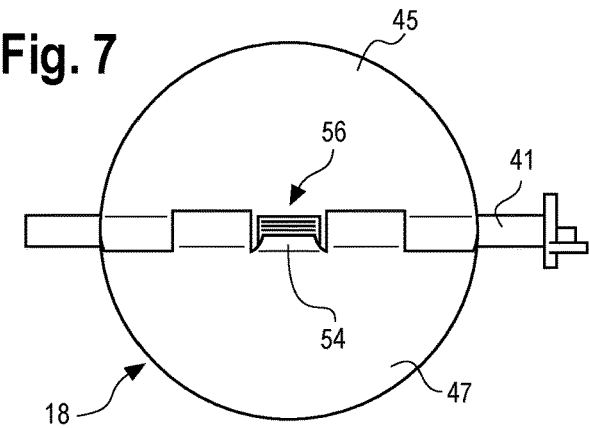
FIG. 7 is an assembled top plan pictorial view of the component of FIG. 6 illustrating the component in its closed position.
Figure 8:
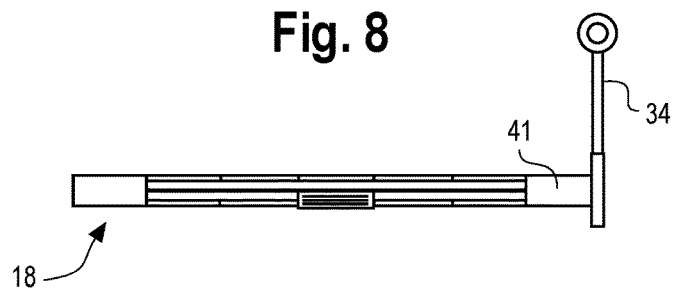
FIG. 8 is an elevational view of the component of FIG. 7.
Figure 9:
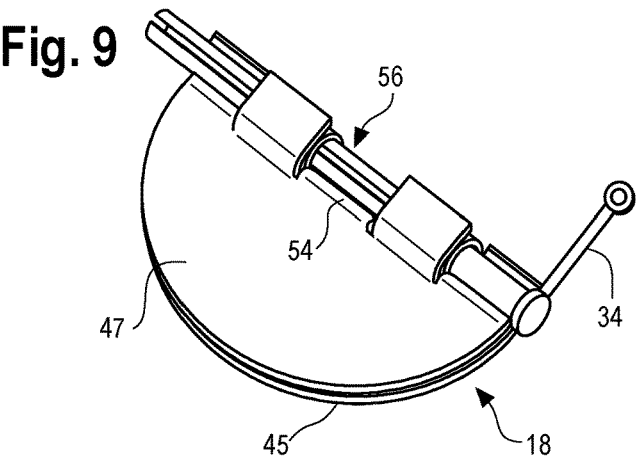
FIG. 9 is a pictorial diagrammatic view of the component of FIG. 7 and illustrated in an open position.
Figure 10:
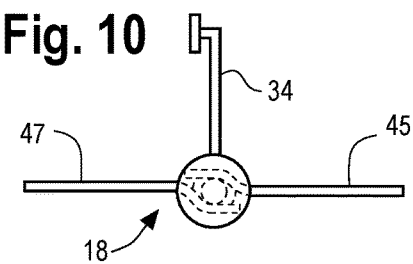
FIG. 10 is a side elevational view of the component of FIG. 7.

A single spur gear tooth 54 (FIGS. 6, 7, 8 and 9) on the valve member portion 47 between the sleeves 48 and 49 is driven by a quarter revolution spur gear segment 56 on the sleeve 46 of the valve member portion 45 when the shaft 41 rotates to move rotatably the valve member portion 45. In this manner, as the shaft 41 rotates by means of the spring 23, both valve member portions 45 and 47 move from a downwardly depending over lapping position as shown in FIGS. 5 and 9, into a co-planar closed position as indicated in FIGS. 4 and 7.

The hydrant shear valve 10 redirects the break to a specific point on the valve body and water pressure itself is used to close and maintain the valve member 18 in its closed co-planar position until the shear valve 10 is repaired or replaced. Repairing or replacing the broken shear valve 10 is accomplished by unbolting it from the hydrant 12 and the water supply pipe.

Referring now to FIGS. 11 through 23, is shown a hydrant shear valve 110, which is similar to the hydrant shear valve 10, except that substantially all of the mechanisms are internal and the overall construction is more compact. The valve 110 may be fixed in a break away manner to the underside of a fire hydrant 112, and to an upper annular flange 118 of a hydrant water supply pipe 116. In this manner, should the hydrant 112 receive an overwhelming impact such as by an inadvertent collision with a vehicle such as the vehicle 114 of FIG. 11 or for any other reason, the hydrant 112 separates from the shear valve 110 to trip the valve 110 to cause it to shut off water flow from the supply pipe 116.

The shear valve 110 may include an annular circular valve body 121 composed of rigid material such as steel or a suitable composite material. A series of spaced apart fasteners receiving through holes generally indicated at 123 extend axially to permit the valve body 121 to be secured releasably to the hydrant 112 and fixedly to the water supply pipe flange 118 as hereinafter described in greater detail.

Figure 22:
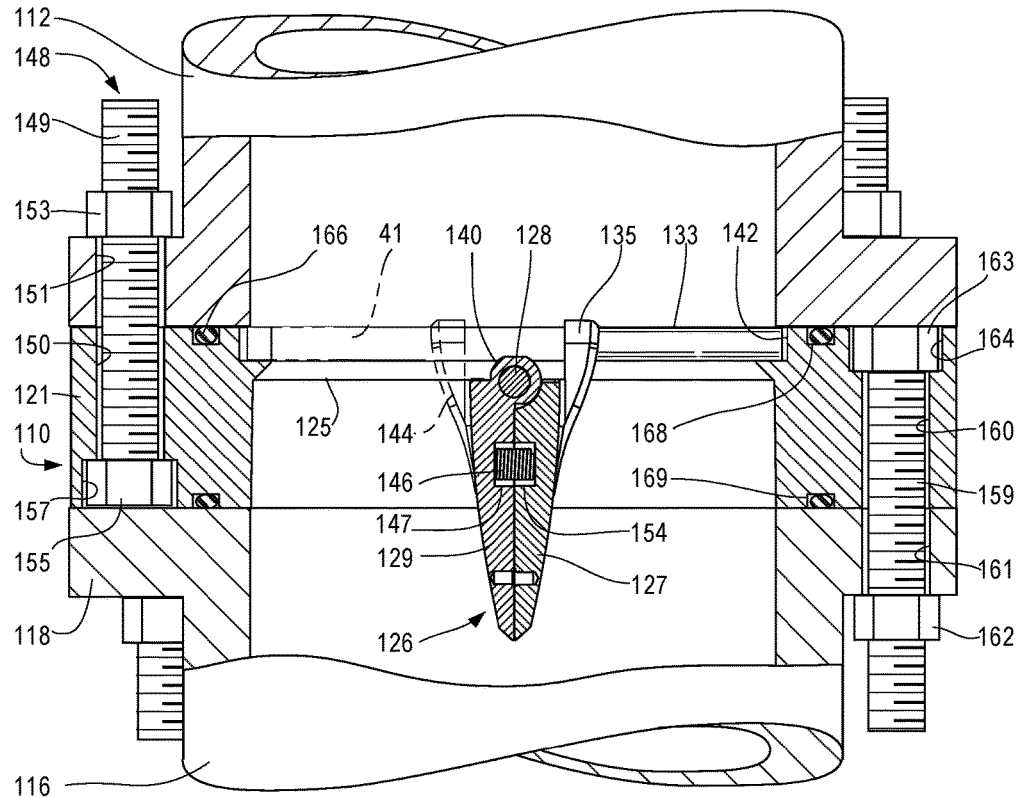
FIG. 22 is a sectional view of the valve taken substantially on line 22-22 of FIG. 12, illustrating the valve in its opened position.
Figure 23:
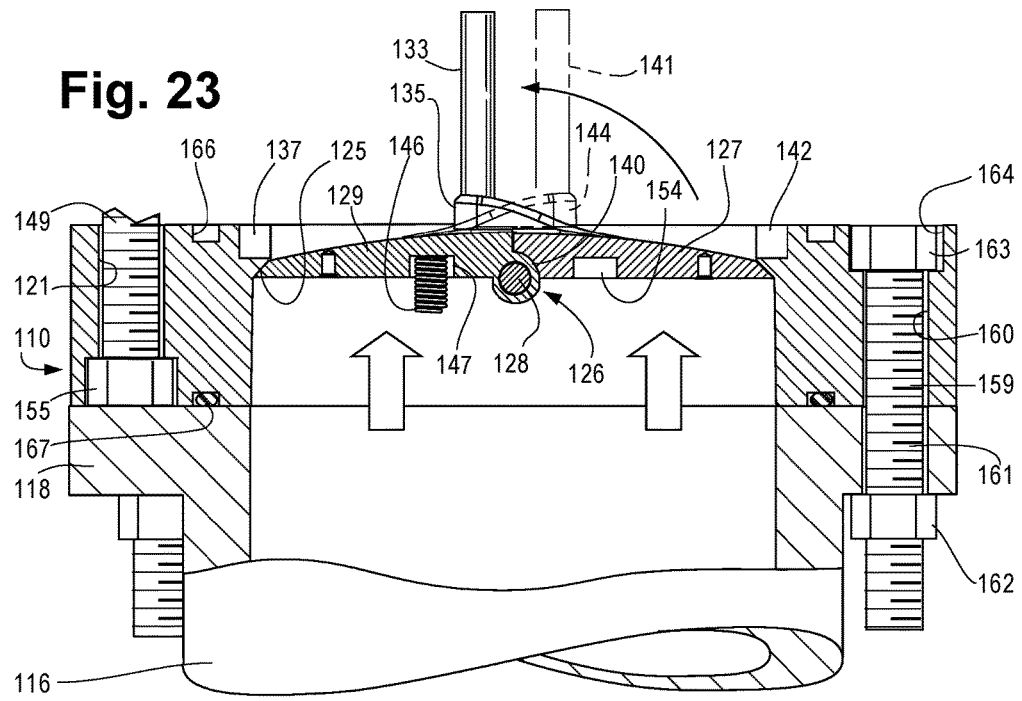
FIG. 23 is a sectional view of the valve taken substantially on line 23-23 of FIG. 13, illustrating the valve in its closed position.

Referring now to FIGS. 22 and 23, an annular valve seat 125 at the upper portion of the valve body 121 is adapted to receive a two-piece valve member 126 to seal off a flow of liquid from the pipe 116. The valve member 126 may include a semi-circular valve member portion 127 and a semi-circular valve member portion 129, which are pivotally mounted on a transverse pivot pin 128. The valve member portions are normally positioned in an overlapping configuration in a valve open position as shown in FIG. 12. When an event occurs that causes the hydrant 112 to be dislodged from the valve 110, the valve member portions 127 and 129 move apart and are caused under the force of the water pressure from the supply pipe 116 to pivot about the pivot pin 128 to move upwardly into sealing engagement with the valve seat 125 as shown in FIG. 13.

Figure 14:
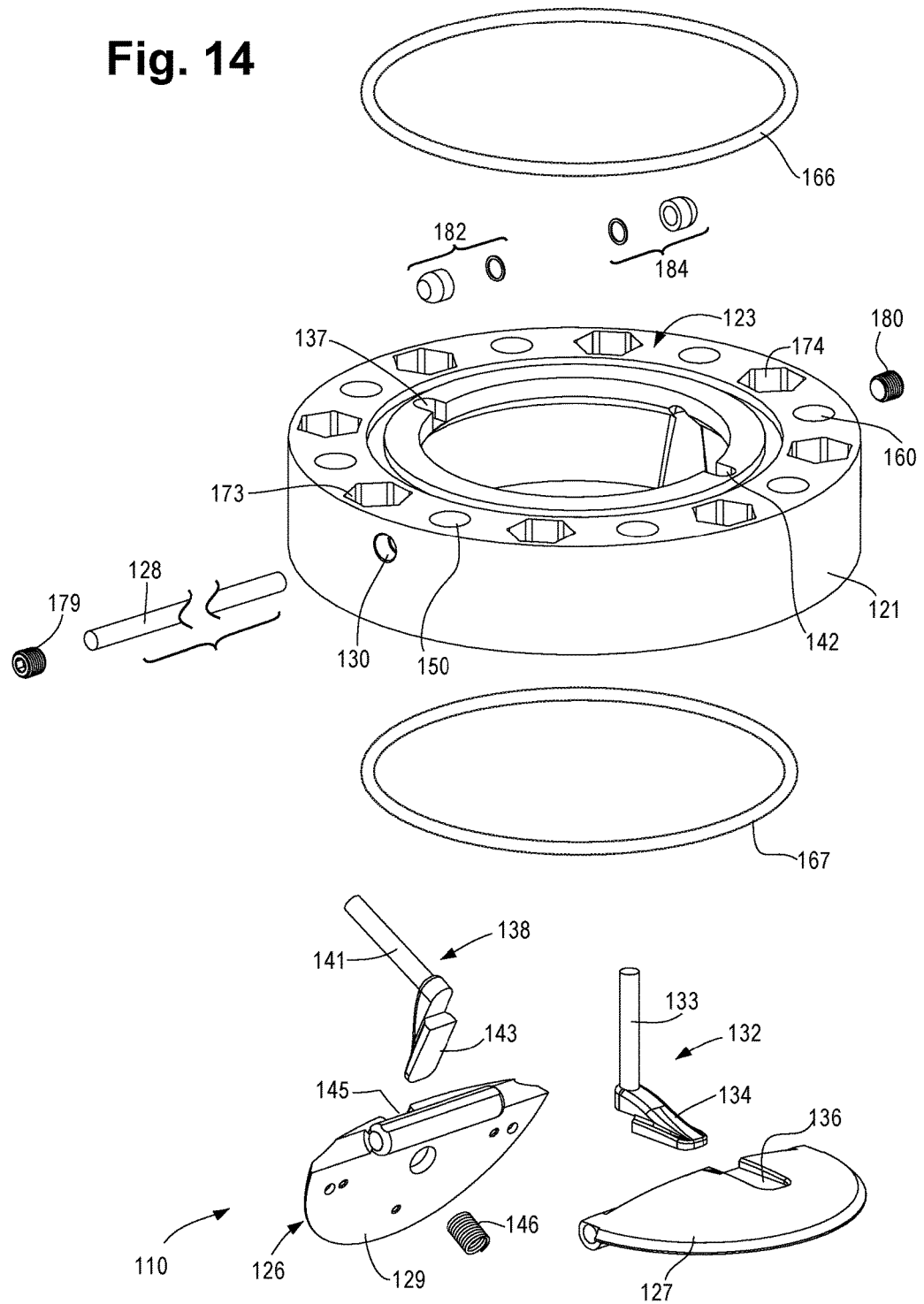
FIG. 14 is an exploded view of the valve of FIG. 11.
Figure 15:
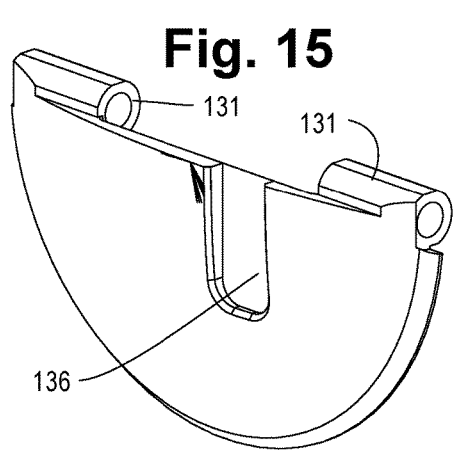
FIGS. 15, 16 and 17 are pictorial views of a two-piece valve member portion of the valve of FIG. 11.
Figure 16:
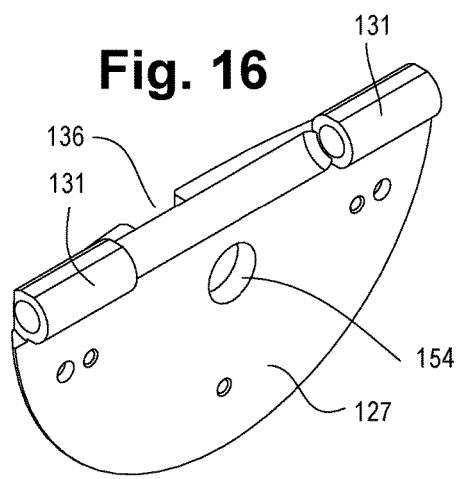
Figure 17:
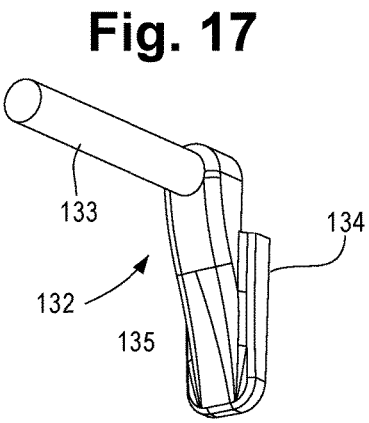
Figure 18:
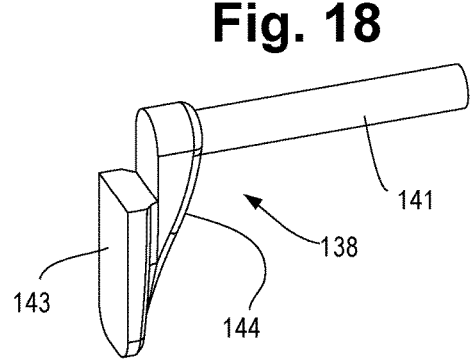
FIGS. 18, 19 and 20 are pictorial views of the other two-piece valve member portion of the valve of FIG. 11.
Figure 19:
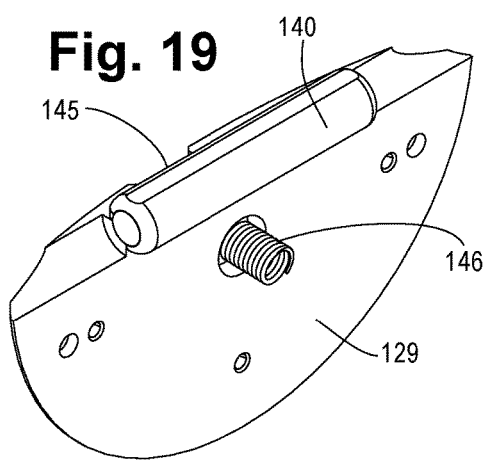

As indicated in FIG. 14, the pivot pin 128 is fixed to the valve body 121 at the opposite ends of the pin 128, which ends fit within a pair of diametrically opposed side holes such as the hole 130 (FIG. 14). A pair of spaced-apart sleeves generally indicated at 131 on the valve portion 127 (FIG. 16) receive therebetween a sleeve 140 on the valve portion 129 so that the sleeves 131 and 140 may receive the pivot pin 128 and pivot thereabout.

As best seen in FIGS. 14-20, an L-shaped bias member 132 is fixed to the valve portion 127 by suitable means such as by welding and grinding off the welds (not shown) and includes an arm or rod 133 extending at right angles to a smoothly contoured foot 135 having a foot pad 134 fixed within a complementary recess 136 of the valve portion 127 (FIG. 14). As best seen in FIGS. 12 and 22, the arm 133 fits into a recess 137 at the top of the valve body 121 so that when the valve body 121 is fixed to the underside of the hydrant 112, the hydrant 112 holds down the arm 133 within its recess 137 so that the valve portion 127 is maintained in the valve open position as shown in FIGS. 12 and 22.

Figure 20:
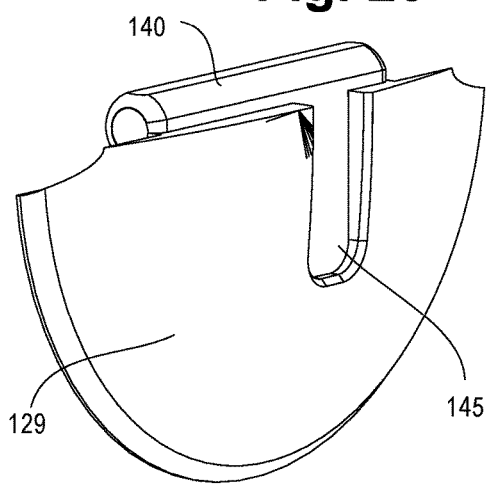
Figure 21:
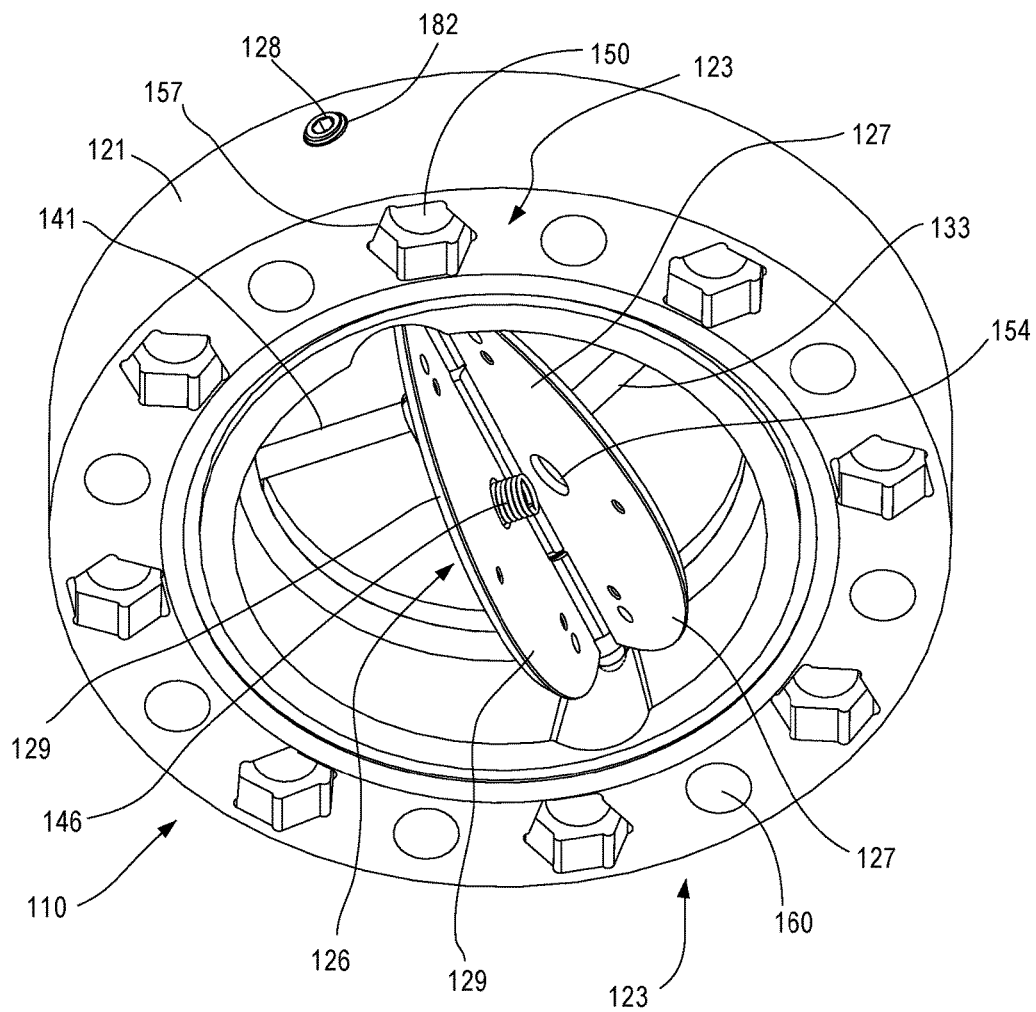
FIG. 21 is a bottom and side pictorial view of the valve of FIG. 11, illustrating it in the process of moving from an open position towards a closed position.

Similarly, an L-shaped bias member 138 is similar to the bias member 132 and includes an arm or rod 141 which fits into an upper arm receiving recess 142 for the same purpose as the arm 141. A smoothly contoured foot 144 having a foot pad 143 extends at right angles from the arm 141 and is fixed within a complementary shaped recess 145 in the valve portion 129 as best seen in FIG. 20. Therefore, when the hydrant 112 is inadvertently removed from the valve 110, both arms 133 and 141 become free to pivot out of their respective recesses 137 and 142 and are forced under the water pressure applied via the pipe 116 into the valve closed position in sealing engagement with the valve seat 125, as best seen in FIGS. 13 and 23.

In the valve closed position as best seen in FIG. 22, the outer surfaces of the valve portions 127 and 129 are each smoothly contoured to facilitate streamlined laminar flow of fluid around the valve 126 so that when the hydrant 112 is used during normal operation to deliver water via a hose (not shown) for firefighting or other purposes, the hydrant can function normally.

As shown in FIGS. 22 and 23, a spring 146 is fixed at one of its ends in a spring receiving recess 147 of the valve portion 129 and its opposite end bears against a spring receiving recess 154 of the valve portion 127. In so doing, when an event occurs where the fire hydrant 112 is removed from the valve 110, the spring 146 resiliently urges the valve portions 127 and 129 apart so that flowing water under pressure within the pipe 116 forces the valve portions against the valve seat 125.

At least one frangible actuator such as frangible actuator 148 breaks away when the hydrant is hit with sufficient force or impact to free the bias members 132 and 138 for causing the valve member portions 127 and 129 to move toward the valve closed position. For example, the frangible actuator 148 may include a fastener in the form of a sheer bolt 149 extending through a valve body hole 150 aligned with a hole 151 in an annular hydrant flange 152 and secured in place by a nut 153 (FIGS. 22 and 23). A hex head 155 of the bolt 149 is securely positioned within a hex shaped counter sunk enlarged portion 157 of the hole 150 in the lower portion of the valve body 121.

Figure 11:
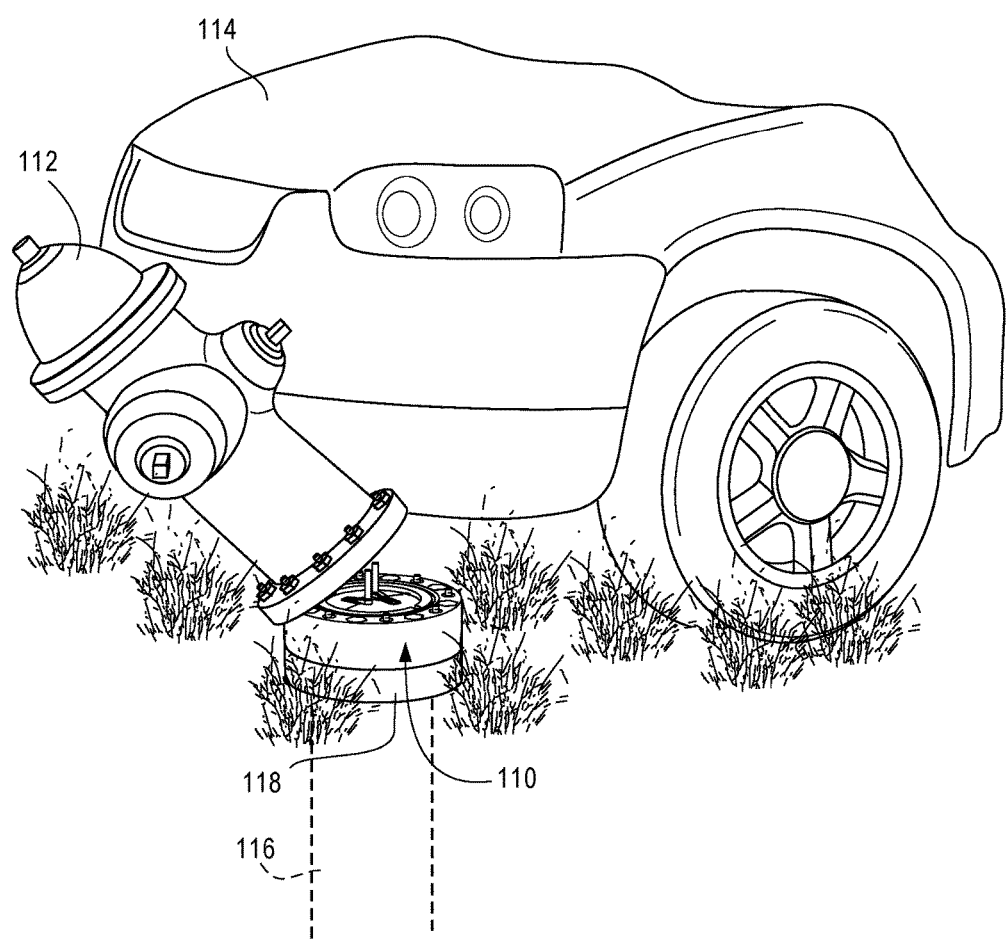
FIG. 11 is a pictorial elevational view of a hydrant shear valve which is also constructed according to another embodiment, and which is illustrated mounted to a hydrant in fluid communication with a hydrant water supply, illustrating the hydrant being knocked over by a vehicle.

According to an embodiment, a series of spaced-apart frangible actuators such as the frangible actuator 148 are provided and extend upwardly from the valve 110 for engaging and secured releasably to the hydrant flange 152 so that normal operation of the hydrant can take place since the valve member 126 is retained in its opened position (FIG. 22). When a hydrant removing event takes place, the shear bolts such as the bolt 149 breakaway as shown in FIG. 23 to free the arms 133 and 141. Additionally, due to the low profile compact figuration of the valve 110, as shown in FIG. 11, the hydrant 112 can be mounted to the water pipe 116 at a customary height above the ground to facilitate hose connections.

Considering now the connection of the valve 110 to the water pipe flange 118 in greater detail, alternating with the sheer bolt receiving holes such as the hole 150, are axially extending holes such as a hole 160 receiving conventional bolt such as a conventional bolt 159 extending through the hole 160 and into a hole 161 in the water pipe flange 118 and secured in place by a nut 162. A hex head 163 of the net 162 is positioned within a hex counter sunk enlarged portion 164 of the hole 160. In this manner, a series of spaced-apart conventional bolts such as the bolt 159 extend from the bottom of the valve 110 and are adapted to be fastened to the water pipe flange 118 in a fixed manner to hold the valve 110 in place during a hydrant removal event. Therefore, as indicated in FIG. 23, when such an event occurs, the shear bolts such as the sheer bolt 149 fractures and breaks away to free the hydrant from the valve 110. Thus, the valve 10 generally remains intact and only the shear bolts require replacement to secure a hydrant to the valve 110. Therefore, the use of the valve 110 is cost effective since a new sheer valve is usually not required after an event.

An upper O ring 166 and a lower O ring 167 fit within respective annular recesses 168 and 169 in the upper portion of the valve body 121 to seal the valve body 121 to the lower portion of the hydrant flange 152 to connect the hydrant 112 to the water pipe 116 in fluid communication through the annular valve body 121. As shown in FIG. 14, pairs of cap nuts and washers 182 and 184 may be used to secure the ends of the pivot pin 128 on the outside of the valve body 121.

Valve Member Portions and Bias Member Foot Profile Contours

Figure 24:
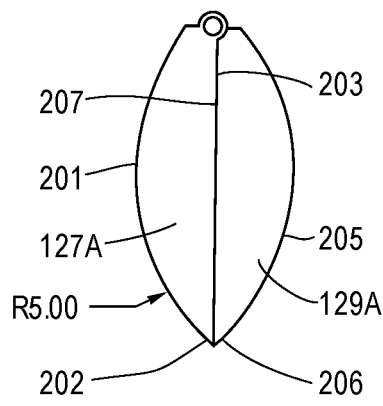
FIGS. 24-27 are diagrammatic views of the valve member parts to describe in detail the profile contours thereof.

Referring now to FIGS. 24-31, different configurations for the valve member portions and bias member foot portions will now be considered to enable the shear valve to present little or no hydrostatic resistance to water flowing through the shear valve in its open position during normal firefighting operations. By trial and error experimentation, it has been discovered that there are a unique range of radii of curvatures of the valve member portions with reference to FIGS. 24 and 25. There is shown in FIG. 24 valve member portions 127A and 129A which are similar to valve member portions 127 and 129. The valve member portions 127A and 129A are shown in the open position and each has a small radius of curvature such as about 5 inches. They thus present a large bulbous profile for water to flow past to enter a hydrant. However, in accordance with an embodiment, water under pressure is guided smoothly along and around the valve member portions 127A and 129A in a laminar flow with causing little or no turbulence. It was discovered that having a substantially smaller radius of curvature, such as less than 5 inches, would cause the pair of valve members to create unwanted resistance to the water flow.

Figure 25:
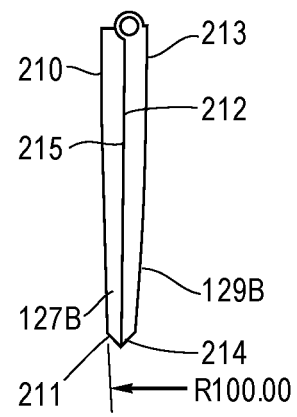

As shown in FIG. 25, a pair of valve member portions 127B and 129B, which are similar to valve member portions 127 and 129 respectively and which each have a large radius of curvature of 100 inches to present a much narrower profile. It has been discovered that having a substantially larger radius of curvature would cause unwanted hydrostatic resistance and even unwanted turbulence. With such a larger radius of curvature substantially greater than 100 inches, water flowing along the members 127B and 129B is divided into two separate paths of travel from the bottom to the top thereof as viewed in FIG. 25, and then will collide once past the members in a turbulence manner, thereby causing an unwanted and undesirable reduction in quantity and water pressure of water flowing through a hydrant.

Thus, in summary, it has been discovered that the radii of curvatures for the valve member portions should be between about 5 inches and about 100 inches. A more preferred range should be between about 25 inches and about 80 inches. The most preferred range for at least some applications is between about 40 inches and about 65 inches.

The valve member 127A includes an outer contoured surface 201 which has a radius of curvature of 5 inches and which terminates at its bottom in a valve seat engaging chamfered edge 202 and has an opposite generally flat inner surface 203. The valve member 129A includes an outer contoured surface 205, which also has a 5 inch radius of curvature terminating in a bottom valve seat engaging chamfered edge 206 and has an inner flat surface 207. The chamfered edges 202 and 206 engage one another to form a leading edge line of engagement for the water flowing from the bottom past the top thereof as viewed in the drawings.

The valve member 127B includes an outer contoured surface 210 which has a radius of curvature of 100 inches and which terminates at its bottom in a valve seat engaging chamfered edge 211 forming a leading edge line of engagement, and has an opposite generally flat inner surface 212.

Figure 26:
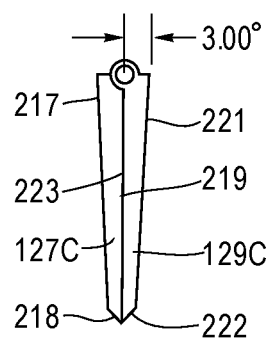
Figure 27:
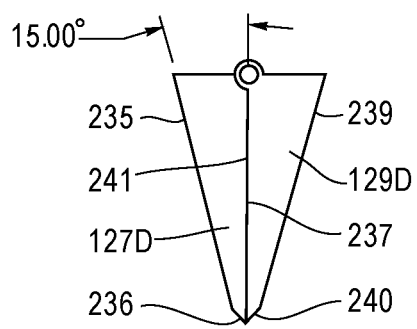

It has been discovered that if a radius of curvature of greater than 100 inches is desired, then as shown in FIGS. 26 and 27, a certain range of profile angles may be employed and yet avoid unwanted hydrostatic resistance and turbulence.

Considering now the profile angles of the valve member portions with reference to FIGS. 26 and 27. There is shown in FIG. 26 valve member portions 127C and 129C which are similar to valve member portions 127 and 129. The valve member portions 127C and 129C are shown in the overlapping open position and each one has a generally flat outer configuration to provide an overall wedge shape from a bottom leading edge line of engagement between the members 127C and 129C, and tapered outwardly angularly. Water under pressure flowing from the bottom to the top of the valve member portions 127C and 129C are caused to divert and separate sufficiently to avoid colliding once past the valve member portions 127C and 129C to avoid unwanted reduction in quantity and water pressure.

The valve member portion 127C has an outer flat surface 217 terminating in a chamfered edge 218 with a flat inner surface 219. The angle between the outer surface 217 and the inner surface 219 is 3°. To have an angle of substantially less than 3° has been found to provide an unwanted reduction in water quantity and pressure.

The valve member portion 127D has a generally flat outer surface 235 terminating in a lower chamfered edge 236 and has a flat inner surface 237, which is disposed at an angle of 15° to the outer surface 235. Similarly the valve member portion 129D has a generally flat outer surface 239 terminating at a lower chamfered edge 240, and has an inner flat surface 241 disposed at an angle of 15° to the outer surface 239. The chamfered edges 236 and 240 substantially engage one another along a continuous lead edge line of engagement to help diverge the water in a more laminar flow. It has been found that if a substantially greater angle is utilized, then an unwanted reduction in water quantity and pressure may result.

In general, when a radius of curvature greater than 100 inches is employed, then a range of profile angles between about 3° and about 15° may be used to avoid unwanted reduction in water quantity and pressure.

Figure 28:
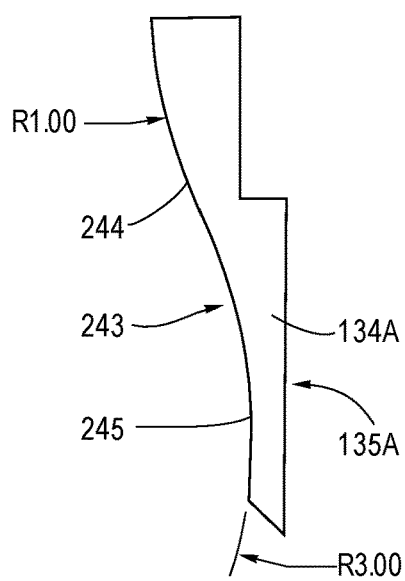
FIGS. 28-31 are diagrammatic views of the L-shaped bias members foot to describe in detail the profile contours thereof.
Figure 29:
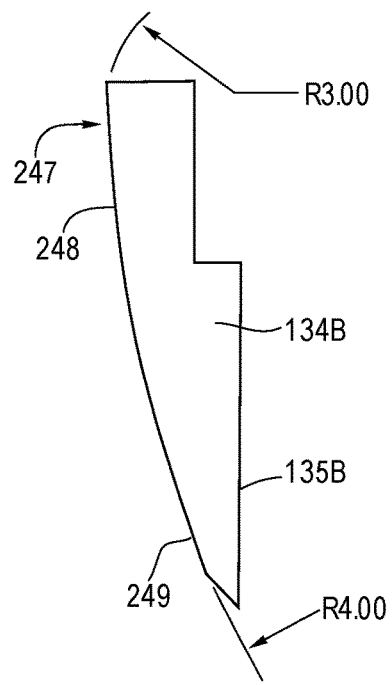

With reference of FIGS. 28 and 29, there is shown a bias member foot 135A having a pad 134A (similar to foot 135 and pad 134) and a bias member foot 135B bearing a pad 134B (similar to foot 135 and pad 134) provide a range of radii of curvatures from smaller to larger to avoid the unwanted reduction in water quantity and pressure.

The foot 135A includes a compound radius of curvature 243 comprising a convex portion 244 of 1.0 inch and a concave portion 245 of 3.0 inches. The foot 135B includes a compound radius of curvature 247 comprising an upper convex portion 3.0 inches and a lower convex portion 4.0 inches. Thus, the range of compound outer surface radii of curvatures is between about 1.0 inch to about 4.0 inches.

Figure 30:
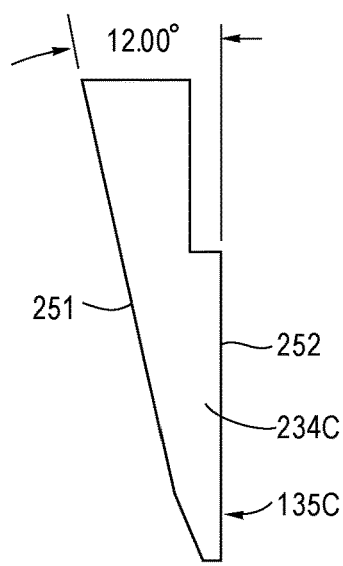
Figure 31:
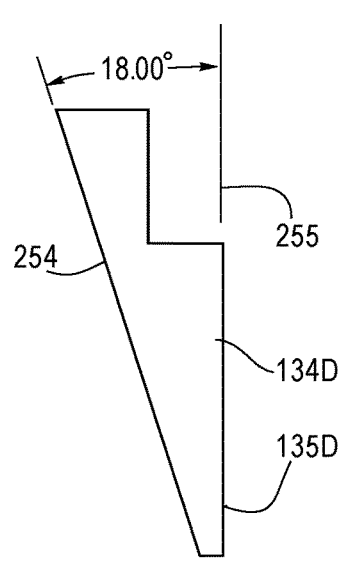

Referring to FIGS. 30 and 31, there is shown bias member foot 135C having foot pad 134C (similar to foot 135 and pad 134) and bias member foot 135D having pad 134D (similar to foot 135 and pad) provide a range of profile angles from smaller to larger. The range is between about 12° and about 18°.

The valve member portion 135C has an outer flat surface 251 and an inner flat surface 252 forming an angle of 12° therebetween. The member 135D has an angle of 18° between its outer flat surface 254 and its inner flat surface 255.

Referring now to FIGS. 32-37, there is shown a hydrant shear valve 260, which is a further embodiment, and which is similar to the valve 110 except generally as to the manner of attachment to the valve member portions and the frangible actuators. The shear valve 260 includes a two piece valve member 261, which is similar to the members 18 and 26, and which may be in the form of C-shaped valve member portions 262 and 263 similar to the respective valve member portions 45,127 and 45,129. The lower ends of bias member arms or rods 264 and 265 are each connected to respective valve member portions 262 and 263 by respective pivot connections 266 and 267. The pivot connections 266 and 267 present little or no unwanted reduction in water quantity and/or pressure.

Figure 33:
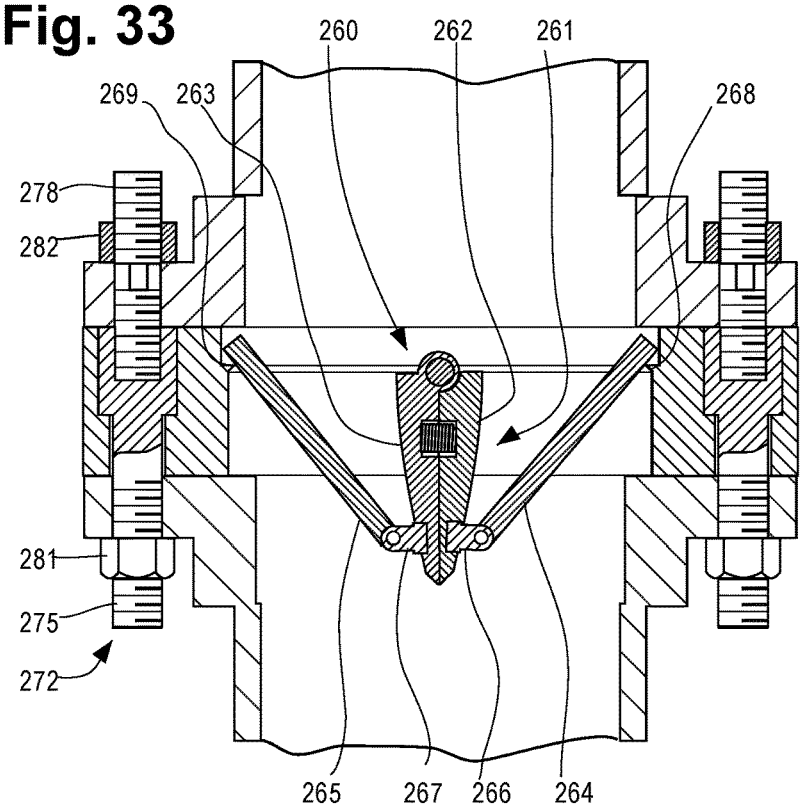
FIG. 33 is a sectional view of the valve of FIG. 32, taken substantial on line 32-32 thereof.
Figure 34:
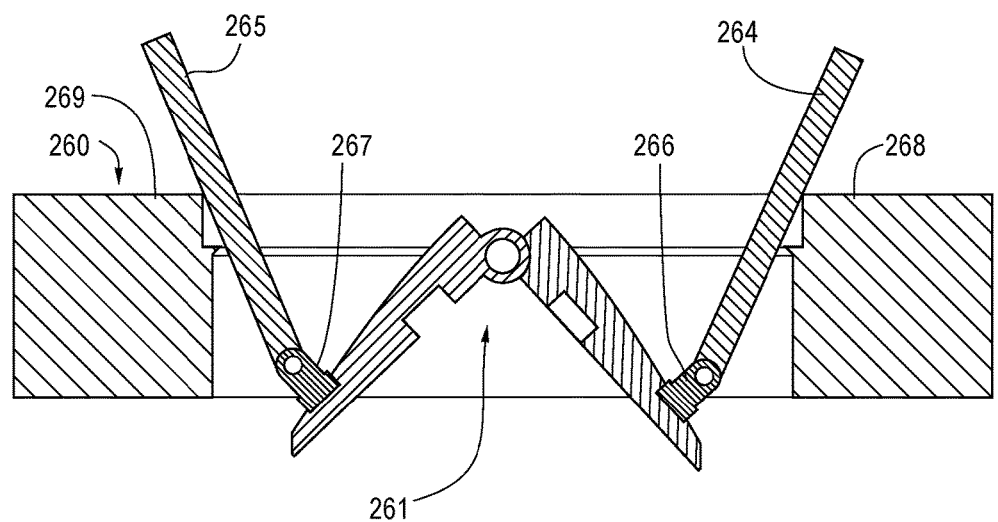
FIGS. 34 and 35 are sectional views of the valve of FIG. 32, illustrating it in the process of closing and in the closed position respectively.
Figure 35:
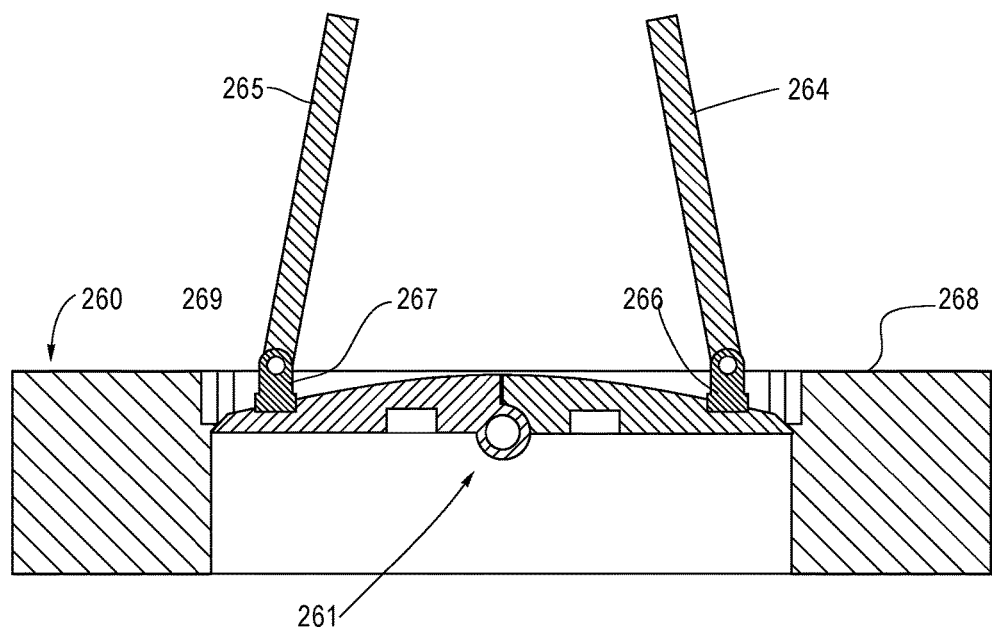
Figure 36:
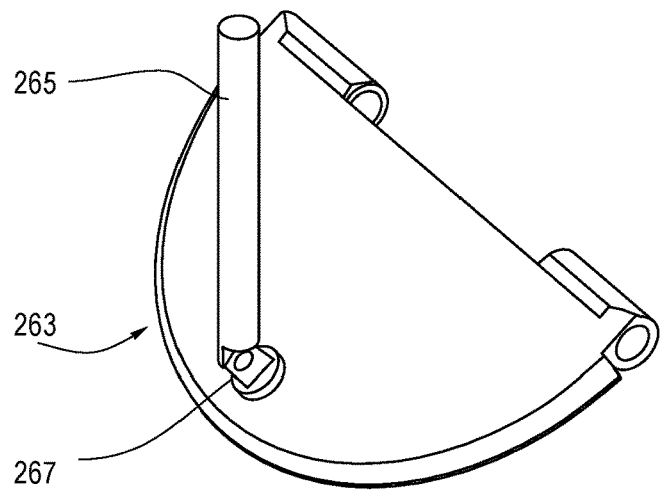
FIG. 36 is an enlarged pictorial view of a valve member portion of the valve of FIG. 32.
Figure 37:
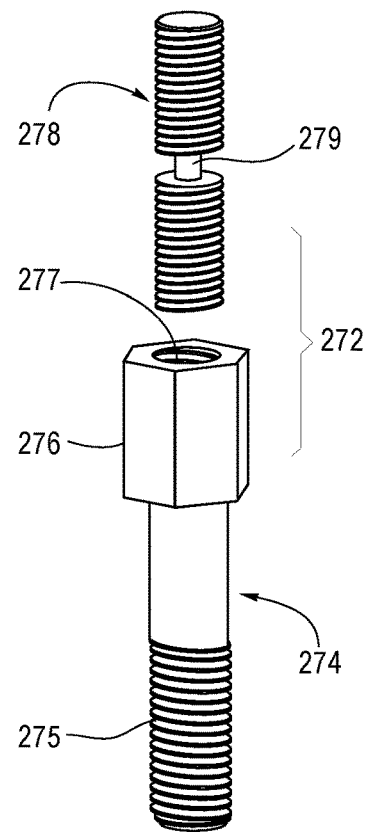
FIG. 37 is an exploded pictorial view of a frangible actuator for a shear valve according to an embodiment of the invention.

A pair of grooves 268 and 269 receive the upper ends of the arms 264 and 265 respectively as best seen in FIG. 33. The upper ends of the arms 264 and 265 are held down by the hydrant to hold the valve member portions in its open position shown in FIG. 33. If the hydrant is dislodged from the valve 260, the water under pressure forces the valve member 261 to abruptly close as shown in FIGS. 34 and 35.

Figure 32:
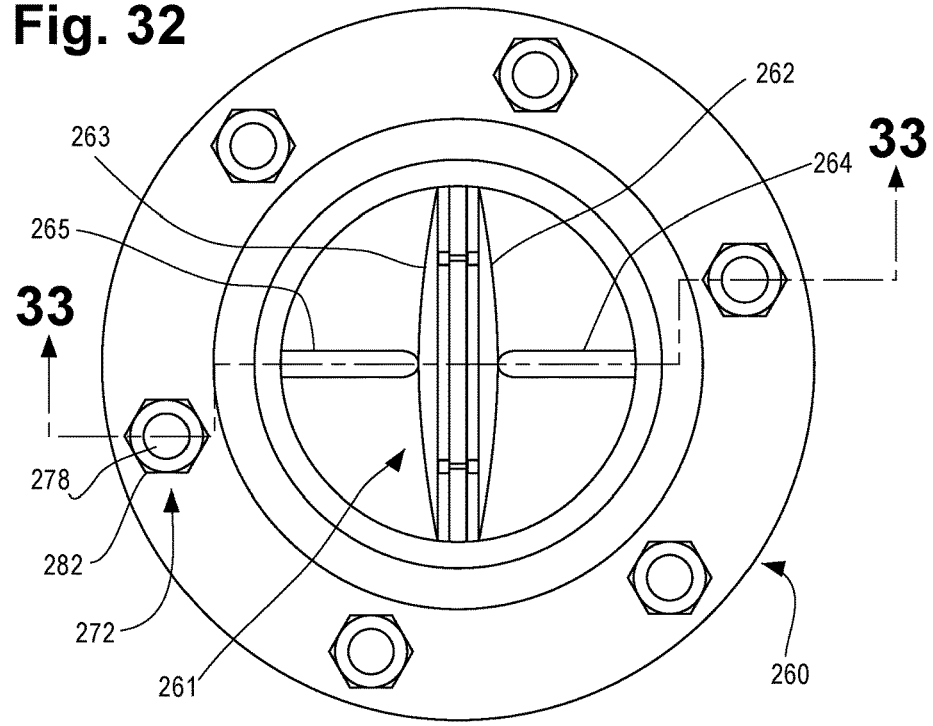
FIG. 32 is a top view of a shear valve constructed according to a further embodiment.

A series of frangible actuators such as the actuator 272 fasten releasably the valve 260 in fluid communication between a water supply pipe 273 and a hydrant 275, as best seen in FIGS. 32 and 33. The actuator includes a thread receiver stud 274 for extending through a counter sunk opening in the body of the valve 260 and for receiving threadably a threaded shear stud 278 extending through a hole in the hydrant flange. The shear stud 278 includes a frangible or breakaway reduced-diameter portion 279 to cable the hydrant to break away from the valve 260 so that the valve can quickly cut off water flow from the supply pipe. The shear stud 278 may be purchased under trade name "Tripac".

The thread receiver stud 274 includes a threaded portion 275 for extending through a hole in the supply pipe flange and secured in place with a nut 281. The thread receiver stud 278 includes an enlarged hex head portion 276 for fitting into a counter-sunk hole in the valve body. The threaded shear stud 278 may extend through a hole in the hydrant flange and extend threadably into the internal threaded opening in the hex head portion 276 of the thread receiving stud 274. A nut 282 may be threaded onto a portion of the shear stud extending above the hydrant hole to secure the valve 260 to the hydrant releasably.

When the hydrant is hit with a sudden force or impact, the frangible actuators such as the actuator 272 break away such as at the portion 279 of the actuator 272. The valve member 261 can then be forced abruptly into its closed position as shown in FIG. 35. The threaded receiver studs such as the stud 274 maintain the valve 260 firmly secured in place on the supply pipe.

Thus the valve 260 may have the same hole pattern as both the hydrant and the supply pipe. Therefore in the situation where it may be required that the outlet of the hydrant face in a certain direction dictated by the hole pattern, the inventive frangible actuators enable the valve 260 to be mounted in the desired orientation since the hole pattern for the valve matches exactly with the hole pattern of both the hydrant and the supply pipe.

The use of the words "about", "approximately", or the like imply a tolerance of plus or minus 20 percent.

Although the invention has been described with reference to the above examples, it will be understood that many modifications and variations are contemplated within the true spirit and scope of the embodiments and claims of the invention as disclosed and claimed herein. Many modifications and other embodiments of the invention set forth herein will come to mind to one skilled in the art to which the invention pertains having the benefit of the teachings presented in the foregoing descriptions and the associated drawings. Therefore, it is to be understood that the invention shall not be limited to the specific embodiments disclosed and that modifications and other embodiments are intended and contemplated to be included within the scope of the appended claims. Although specific terms are employed herein, they are used in a generic and descriptive sense only and not for purposes of limitation.

What is claimed is:

1. A hydrant shear valve for a hydrant coupled in fluid communication with a hydrant water supply pipe having a pipe flange, comprising:

a valve body having fastener receiving openings for mounting the valve in fluid communication between the hydrant and the water supply pipe;

the valve body having a valve seat;

a two-piece valve member including two separate valve member portions each separately and independently pivotally mounted in the valve body to move independently between an open position and a closed position;

the separate valve member portions being disposed overlapping one another axially aligned within the valve body in the open position and being disposed in a coplanar configuration in engagement with the valve seat in the closed position;

bias members for maintaining releaseably the valve member portions in the open position and for permitting the valve member portions to be moved toward the closed position under a force of fluid flowing from the supply pipe;

wherein bias members are held down by the hydrant in a plurality of valve body recesses when the two-piece valve member is disposed in the open position and are permitted to move freely when the hydrant is at least partially dislodged from the valve body;

at least one actuator for freeing the bias members to permit the valve member portions to move independently toward the closed position under the force of fluid under pressure from the supply pipe when the hydrant is hit with sufficient impact; and each valve member portion having an outer surface and an inner flat surface being disposed at an angle therebetween in cross section to divert fluid from the supply pipe around the valve member portions when disposed in the open position, the angle being between about 3° and about 15°.

2. The valve of claim 1, where in the range of the angles is between about 5° and about 13°.

3. The valve of claim 2, wherein the range of the angles is between about 7° and about 11°.

4. The valve of claim 1, further including at least one bias member foot having a profile angle of between about 12° and about 18°.

5. The valve of claim 4, wherein the profile angle is between about 14° and about 16°.

6. The valve of claim 1, further including at least one bias member foot having a compound radius of curvature of an outer surface of the foot between about one inch and about four inches.

7. The valve of claim 6, wherein the compound radius of curvature includes a convex portion and a concave portion.

8. The valve of claim 1, wherein the actuator includes a thread receiver stud for helping fasten fixedly the valve to a water supply pipe, and a threaded shear stud for helping fasten releasably the valve to a hydrant, the shear stud having a frangible portion to release the hydrant from the valve when the hydrant is dislodged from the valve.

9. The valve of claim 8, wherein the thread receiver stud includes an enlarged hex head portion for fitting into a counter sunk hole in the valve body and for receiving threadably the shear stud.

10. A hydrant shear valve for a hydrant coupled in fluid communication with a hydrant water supply pipe having a pipe flange, comprising:
   a valve body having fastener receiving openings for mounting the valve in fluid communication between the hydrant and the water supply pipe;
   the valve body having a valve seat;
   a two-piece valve member including two separate valve member portions each separately and independently pivotally mounted in the valve body to move independently between an open position and a closed position;
   the separate valve member portions being disposed overlapping one another axially aligned within the valve body in the open position and being disposed in a coplanar configuration in engagement with the valve seat in the closed position;
   bias members for maintaining releasably the valve member portions in the open position and for permitting the valve member portions to be moved toward the closed position under a force of fluid flowing from the supply pipe;
   wherein bias members are held down by the hydrant in a plurality of valve body recesses when the two-piece valve member is disposed in an open position and are permitted to move freely when the hydrant is at least partially dislodged from the valve body;
   at least one actuator for freeing the bias members to permit the valve member portions to move independently toward the closed position under the force of fluid under pressure from the supply pipe when the hydrant is hit with sufficient impact; and
   such valve member portion having an outer surface and an inner surface being disposed at an angle therebetween in cross section to direct fluid from the supply pipe around the valve member portions when disposed in an open position, the radii of curvatures of the outer surface being between about 5 inches and about 100 inches.

11. The valve of claim 10, wherein the radii of curvatures are between about 25 inches and about 80 inches.

12. The valve of claim 11, wherein the radii of curvatures are between about 40 inches and about 65 inches.

13. The valve of claim 10, further including at least one bias member foot having a compound radius of curvature of an outer surface of the foot between about one inch and about four inches.

14. The valve of claim 13, wherein the compound radius of curvature includes a convex portion and a concave portion.

15. The valve of claim 13, wherein the actuator includes a thread receiver stud for helping fasten fixedly the valve to a water supply pipe, and a threaded shear stud for helping fasten releasably the valve to a hydrant, the shear stud having a frangible portion to release the hydrant from the valve when the hydrant is dislodged from the valve.

16. The valve of claim 15, wherein the thread receiver stud includes an enlarged hex head portion for fitting into a counter sunk hole in the valve body and for receiving threadably the shear stud.

17. The valve of claim 1, wherein the valve member portions each have lower chamfered edges engaging one another to form a continuous line of engagement.

18. The valve of claim 10, wherein the valve member portions each have lower chamfered edges engaging one another to form a continuous line of engagement.

19. The valve of claim 10, wherein the at least one actuator comprises:
   a thread receiver stud for helping fasten fixedly the valve to the water supply pipe; and
   a threaded shear stud for helping fasten releasably the valve to the hydrant; and
   wherein the thread receiver stud comprises an enlarged head portion for receiving threadably an end portion of the shear stud, the shear stud having a frangible portion to release the hydrant from the valve when the hydrant is dislodged therefrom.

20. The valve of claim 19, wherein the enlarged head is a hex head having a threaded opening therein for receiving an end portion of the shear stud, the hex head for fitting into a counter sunk hole in the valve, the thread receiver stud and the threaded shear stud for receiving threadably nuts thereon to attach the valve between the hydrant and the supply pipe.

* * * * *